United States Patent [19]

Stagner

[11] Patent Number: 5,620,593
[45] Date of Patent: Apr. 15, 1997

[54] MULTI-STAGE IN-WELL AERATOR

[76] Inventor: Joseph C. Stagner, 2305 Inverness Pl., El Dorado Hills, Calif. 95762

[21] Appl. No.: 662,079

[22] Filed: Jun. 12, 1996

[51] Int. Cl.⁶ ..................................... C02F 1/20
[52] U.S. Cl. .................... 210/90; 210/170; 210/199; 210/218; 261/21; 261/122.1
[58] Field of Search .................. 210/90, 170, 198.1, 210/199, 205, 209, 218, 220, 747, 908; 261/21, 122.1

[56] References Cited

U.S. PATENT DOCUMENTS

| | | | |
|---|---|---|---|
| 4,263,143 | 4/1981 | Ebner et al. | 210/218 |
| 4,265,753 | 5/1981 | Manuel | 210/218 |
| 4,278,546 | 7/1981 | Roesler | 210/199 |
| 4,478,765 | 10/1984 | Tubbs | 210/170 |
| 5,147,561 | 9/1992 | Burge et al. | 210/747 |
| 5,180,503 | 1/1993 | Gorelick et al. | 210/170 |
| 5,389,267 | 2/1995 | Gorelick et al. | 210/170 |
| 5,439,594 | 8/1995 | Regan et al. | 210/170 |

Primary Examiner—Neil McCarthy
Assistant Examiner—Theodore M. Green

[57] ABSTRACT

An in-well system for simultaneously treating and extracting groundwater by injecting compressed gas through the groundwater in multiple successive stages as it is pumped out of a well. The process is usable for in-well aeration stripping of Volatile Organic Compounds from groundwater or for other applications in which it is desirable to pass compressed gas through groundwater to alter the physical, chemical, or radiological properties of the groundwater prior to its discharge from the well.

5 Claims, 2 Drawing Sheets

MULTI-STAGE IN-WELL AERATOR

BACKGROUND OF THE INVENTION

The present invention relates to processes for simultaneously treating and extracting groundwater, more specifically of passing gas through groundwater in multiple successive stages as it is pumped out of a well for the purpose of chemically or physically altering the groundwater to condition it for various uses upon discharge.

One such application is air stripping of contaminated groundwater to remove Volatile Organic Compounds as part of a "pump and treat" or in-situ recirculation type system for groundwater remediation. Many sites of groundwater contamination include Volatile Organic Compounds (VOCs) which are removed by "pump and treat" systems that extract contaminated groundwater with electric pumps, transport the extracted water to a central treatment facility, remove VOCs by above ground air stripping devices, and then discharge the treated effluent. These systems can be effective in providing subsurface hydraulic capture and containment of contaminant plumes and in removing VOCs from the extracted water to allow disposal by various means, however they can be expensive, incorporate specialized proprietary manufactured equipment, require professional consultants for design and/or operation, require expensive pilot testing, and in the case of "packed tower" aerators be visually imposing.

Other methods of groundwater cleanup include in-well aeration by air-lift pumping with reinjection of the water into the surrounding soils and/or recirculation of contaminated groundwater through a vadose (unsaturated) zone in which Soil Vapor Extraction can be employed to remove VOCs, but it is unclear if such an arrangement can be configured to provide hydraulic capture and containment of contaminant plumes since little or no water is removed from the affected hydraulic formation(s). Also, in such systems otherwise uncontaminated soils may be contaminated by partially treated groundwater percolation in the recirculation process. These methods may also not work in geologic settings void of a sufficiently permeable formation above the water bearing zone being treated to which the treated water can be effectively reinjected or recirculated either by gravity or mechanical means.

One object of the present invention is to provide a simple and inexpensive method for removing VOCs from groundwater. The invention uses widely available common piping and hardware components to construct an in-well device to air-strip VOCs from groundwater during the pumping process. It's claimed advantages over the current common practice of electric pumping and above ground air stripping include substantial cost savings, ease of installation and removal, greater dispersion of VOC discharges to the atmosphere, ability to tailor cleanup efforts at individual well sites, and easier maintenance with less chances of biological or chemical fouling of pumping or air stripping equipment. It's claimed advantages over previous in-well or in-situ air stripping treatment methods include a higher efficiency of VOC removal per pumping pass than systems which employ recirculation of the extracted groundwater to the surrounding geologic formation. This system also improves the feasibility of in-well air stripping at sites where the geology is not conducive to recirculation of the water through the geologic formation for additional treatment by either more passes of in-well stripping, SVE in the vadose zone, or a combination of the two.

Other objects of the invention are to inject gasses other than air into the groundwater to modify characteristics such as pH or metal concentrations, or to condition the temperature of the groundwater prior to discharge by the addition or removal of heat from the water by the injected gas.

The novel features and characteristics of the invention are set forth particularly in the claims herein. Additional objects and advantages will be set forth in the description and drawings or will be evident from them taken in conjunction or will be learned from the construction, operation, and maintenance of the invention.

SUMMARY OF THE INVENTION

The object of the invention is to inject gas into groundwater in successive passes during the pumping of the groundwater from the ground to the surface for the purpose of altering groundwater physical, radiological, or chemical characteristics prior to discharge from the well. The object of altering the characteristics of the groundwater prior to discharge from the well may include but not be limited to air-stripping of Volatile Organic Compounds from the groundwater, raising or lowering the temperature of the groundwater, raising or lowering the pH of the groundwater, introducing chemicals into the groundwater to achieve chemical reactions with compounds occurring in the groundwater, removing radiological contamination from the groundwater, or for any combination thereof.

The process of injecting gas into groundwater within the well in successive passes during the pumping phase is accomplished through the concentric placement of pipes within one or more vertical sections of the well, by moving the groundwater through the separate annular spaces between the concentric pipes in each separate vertical section of the well using gravitational flow caused by pumping the water from a lower to higher elevation within the well, by installing gas injection devices in each section of concentric pipes within the well that will cause gas to be injected into the water and flow vertically up through the water within the annular spaces between the concentric pipes, that will allow the gas to then exit the well at the surface for venting to the atmosphere or for capture at the well head, and by providing for discharge of the treated water from the well. Gas may be delivered to the invention by compressor, tanks, a combination thereof, or other suitable means.

In one construction of the invention the system includes a horizontal plug apparatus that serves several functions including separating two vertical sections of concentric pipes in the well, acting as a gas injection device, providing a structural platform to support the upper sections of pipe, and providing a structural platform for attachment of cables for lifting and lowering the whole invention.

The system also includes hoses to convey gas down the well to the gas injection devices, vent tubes to allow gas to exit the well after it has passed through the water in the lower section of the well and to allow water level measurements in the lower section of the well to be taken while the invention is in place, cables and pulling eyes for lowering and lifting the apparatus in the well, and a special vent tube drain plug assembly to allow draining water from the top vertical section of pipes into the lower section of pipes.

The system further includes a centrally mounted pipe within the well to be used as an eductor tube for air-lift pumping or as a discharge line for electrical or mechanical pumping.

The invention has been constructed and tested for removing VOCs from groundwater and results of the effectiveness of the invention for this purpose have been documented.

BRIEF DESCRIPTION OF THE DRAWINGS

The accompanying drawings, which are incorporated in and constitute part of the specification of the invention, provide a schematical depiction of the preferred embodiment of the invention. When taken in combination with the summary, descriptions, and claims herein they serve to explain the principals and one method of physically constructing the invention.

DESCRIPTION OF THE PREFERRED EMBODIMENTS

Figure 1:
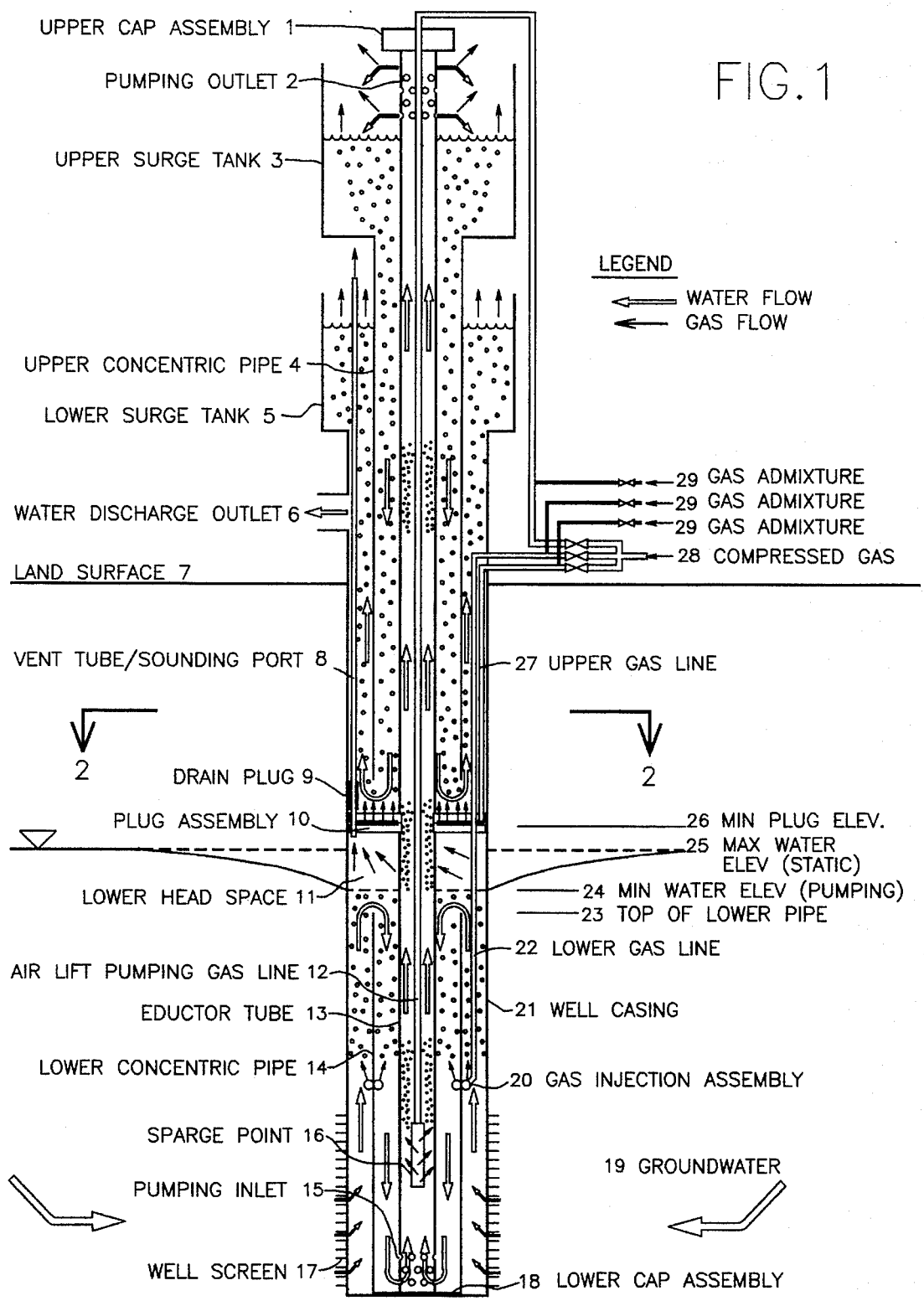
FIG. 1 is a schematic of the invention installed in a water extraction well. Groundwater drawn by gravity toward a pumping inlet at the bottom of the well is aerated as it passes up and then down through the lower vertical concentric pipe arrangement. It is then air lift pumped to the top of the well receiving additional aeration intrinsic to the air lift pumping process, and then it gravity flows down and then up through the upper concentric pipe arrangement where it again is aerated prior to discharge from the well above the ground surface.

The present invention forces groundwater to travel through separate concentric pathways within a well during the pumping process and uses compressed gas injected into the water as it moves through those concentric pathways to alter the chemical, physical, or radiological properties of the water prior to discharge from the well.

Contaminated groundwater 19 is drawn by gravity into a well casing 21 through the well screen 17 as a result of the removal of water from within the well casing by pumping. During pumping, after entering the well casing 21 through the well screen 17 the groundwater is forced by gravity up through the annular space formed by the lower concentric pipe 14 and the well casing 21 (referred to hereinafter as the lower outer annular space), so long as the top of the lower pipe 23 is lower in elevation than the minimum water elevation during pumping 24. If the top of the lower pipe 23 is not lower than the minimum water elevation during pumping 24 then the pumping rate will be reduced to the rate that corresponds to a water drawdown elevation matching the top of lower pipe 23. If the top of lower pipe 23 is higher than the maximum static water elevation 25 then pumping cannot occur because groundwater 19 will have no physical path to gravity flow to the pump inlet 15.

After passing up through the lower outer annular space the water then gravity flows down within the annular space formed by the lower concentric pipe 14 and the eductor tube 13 (referred to hereinafter as the lower inner annular space) to the pumping inlet 15. Water cannot exit the lower inner annular space except through the pumping inlet 15 due to the watertight lower cap assembly 18. Lower cap assembly 18 also prevents the intrusion of untreated groundwater into the lower inner annular space or pumping inlet 15 from the lower outer annular space.

As groundwater flows up within the lower outer annular space and down within the lower inner annular space compressed gas 28 plus any gas admixtures 29 is injected into it via the gas injection assembly 20. Compressed gas 28 and gas admixtures 29 are supplied to the gas injection assembly 20 via the lower gas line 22. Valves and gas flow meters are placed between the compressed gas source 28 and the gas injection assembly 20 to control the flow of injected gas. The injected gas passes through the water and rises into the lower head space 11 and then travels through the vent tube/sounding port 8 to the surface where it vents to the atmosphere or can be collected for treatment. The physical and chemical characteristics of the injected gas and gas admixtures, along with the rate of flow of injected gas and the rate of water flow are controlled to achieve a change of the properties of the water being pumped for such purposes as to remove Volatile Organic Compounds from the water by air stripping or to modify the pH of the water or for other purposes.

Gas injection assembly 20 may be constructed using any suitably sized flexible tubing through which multiple small holes have been drilled to allow compressed gas to bubble out. The flexible tubing is wrapped around the inner and outer circumferences of the lower concentric pipe 14 and hooked to the lower gas line 22. Commercially available flexible sparge points may also be used for the gas injection assembly 20. The diameter of the flexible tubing or sparge points to be used for the gas injection assembly may be equal to or less than the width of the annular space into which they are affixed. It is preferably to wrap the flexible tubing or sparge points on the inner and outer surfaces of the lower concentric pipe 14 in a downward pointing spiral to allow the water to pass by the gas injection assembly 20 without obstruction.

After passing through the lower outer and inner annular spaces and receiving a first stage of treatment from injected gas the water then flows into the pumping inlet 15 in the bottom of the eductor tube 13. The eductor tube is referred to as such because there are certain advantages to using air lift pumping as the means of moving water from the bottom of the well to the top with this invention, however other means such as submersible electrical pumping may be used and in those cases the eductor tube is otherwise simply a pumping discharge line and an air lift pumping gas line 12 is not required.

In the preferred arrangement of using air lift pumping a rigid air lift pumping gas line 12 passes through a watertight upper cap assembly 1 and delivers compressed gas 28 and gas admixtures 29 to a sparge point 16 which injects the gas as very small bubbles into the water within the annular space formed by the eductor tube 13 and air lift pumping gas line 12 (hereinafter referred to as the eductor tube annular space). Using the long known principals of air lift pumping the lower density of the air/water column within the eductor tube annular space causes it to be lifted by the higher density non-aerated water column entering the pumping inlet 15, thus sustaining continuous air lift pumping given proper eductor tube and air line submergence percentage and adequate compressed gas flow. This invention does not include the methods of air lift pumping as a preferred embodiment because such methods are already widely known and in use (such as are used in the water well drilling profession for well development). However this invention does embody the preferred but not essential use of air lift pumping as a means for pumping water from the bottom of a well to the top for the other purposes of the invention, namely to inject gas into the water at several stages within a unique in-well travel path for the pumped water for the purpose of altering the properties of the water prior to discharge from the well. A valve and gas flow meter are placed between the compressed gas source 28 and the sparge point 16 to control the flow of injected gas.

Water thus entering the pumping inlet 15 is moved to the top of the well and discharged out the pumping outlet 2 into the upper surge tank 3. Gas injected into the water for the purposes of air lift pumping separates from the water upon discharge from the pumping outlet 2 or upon water settling within the upper surge tank 3 and is discharged into the atmosphere or collected for treatment.

Water in the upper surge tank 3 then gravity flows down within the annular space formed by the eductor tube 13 and upper concentric pipe 4 (referred to hereinafter as the upper inner annular space), and then up within the annular space formed by the upper concentric pipe 4 and well casing 21 (referred to hereinafter as the upper outer annular space), and leaves the well at the water discharge outlet 6. Lower surge tank 5 is provided to accomodate surges in well flow inherent in the air lift pumping method.

Compressed gas 28 and gas admixtures 29 are injected into the water flowing within the upper inner and upper outer annular spaces via the plug assembly 10 as supplied by the upper gas line 27. Valves and gas flow meters are placed between the compressed gas source 28 and the plug assembly 10 to control the flow of injected gas.

Gas injected from the plug assembly 10 passes upward through the water flowing in the upper inner and upper outer annular spaces and exits from the water surfaces in the upper surge tank 3 and lower surge tank 5 for discharge into the atmosphere or for collection and treatment.

A vent tube/sounding port 8 is provided and serves several purposes including providing a sounding port through which to pass a water depth meter to obtain water level measurements below the plug assembly 10. As indicated earlier the vent tube/sounding port 8 also allows for the venting of gas from the lower head space 11 to the surface at the lower surge tank 5. The vent tube/sounding port 8 allows for the safety relief of water pressure against the plug assembly 10 in the event the minimum plug elevation 26 is set below the maximum static water level 25 or should the maximum static water level 25 rise unexpectedly above the minimum plug elevation 26. The vent tube/sounding port 8 is also equipped with a drain plug 9 which allows for the draining of water above the plug assembly 10 to the well area below for the purpose of reducing the weight of the invention for lifting out of the well or for the purpose of partial recycling of treated water between the upper in-well treatment area and the lower in-well treatment area.

Figure 2:
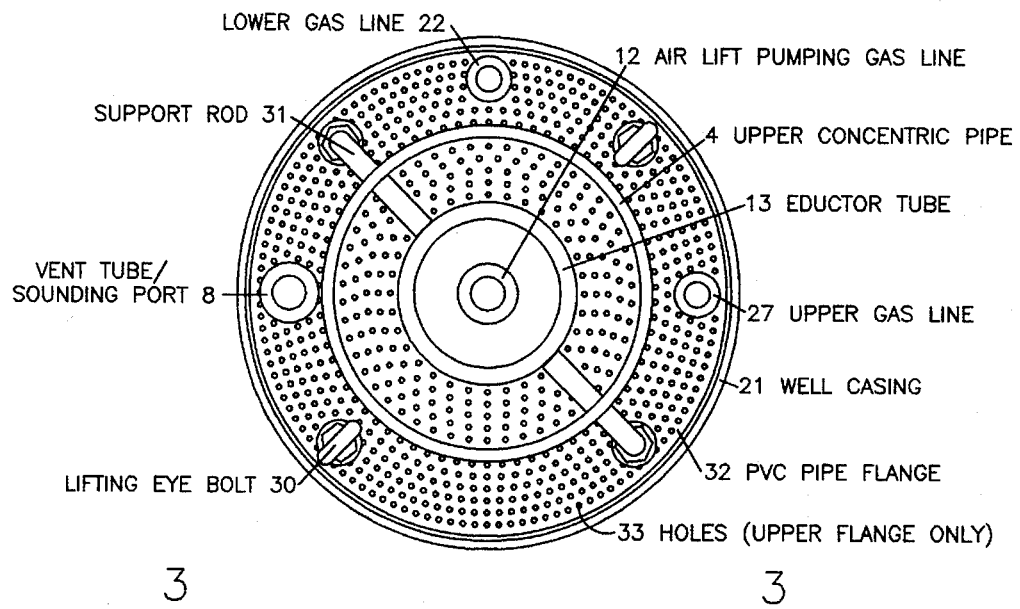
FIG. 2 is a top view of the plug assembly 10.
Figure 3:
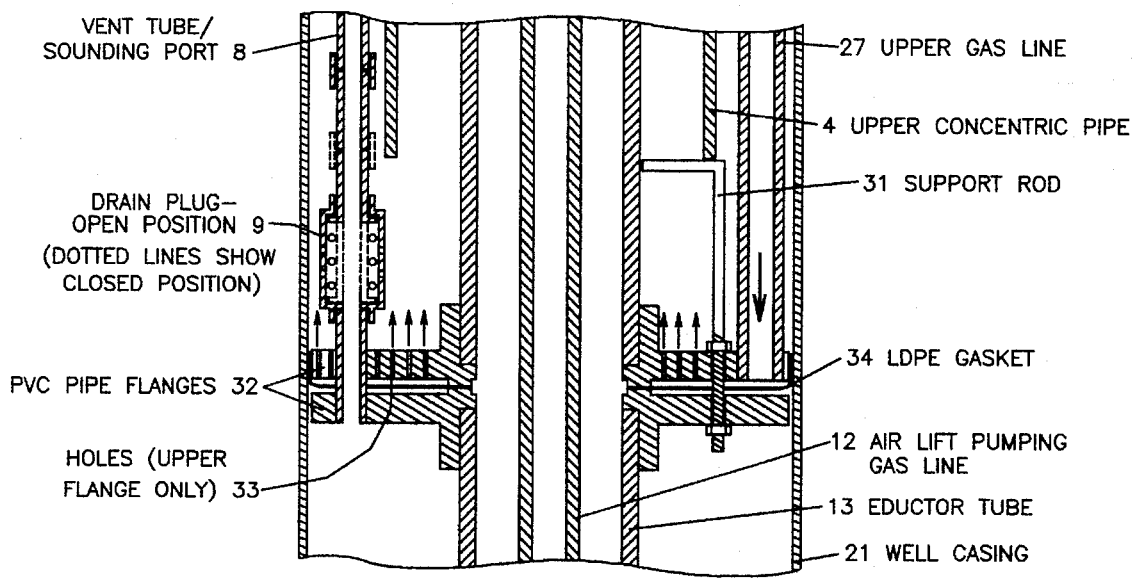
FIG. 3 is a side view of the plug assembly 10 and shows the construction and function of the drain plug 9.

The plug assembly 10 may be constructed in several different ways to provide the functions described herein, however the preferred method of construction is as shown in FIG. 2 and FIG. 3.

In this preferred construction two standard PVC pipe flanges 32 with an outer diameter slightly less than the inner diameter of the well casing 21 are fitted together with a Low Density Polyethylene (LDPE) gasket 34 sandwiched in-between. LDPE gasket 34 is larger in diameter than the PVC flanges 32 to allow the outer edges of the gasket to pinch between the upper PVC flange 32 and the well casing 21 to form a watertight seal. LDPE gasket 34 has a hole equivalent to the inside diameter of eductor tube 13 cut in the center of it so as not to obstruct the flow of water or passage of the air lift pumping gas line 12 within eductor tube 13. LDPE gasket 34 also has holes cut in it corresponding to the size and location of the vent tube/sounding port 8, lower gas line 22, two lifting eye bolts 30, and two support rods 31 so that these components may pass through the gasket but so that the gasket seals the junction of that passage.

Holes 33 are drilled in the upper PVC flange to allow compressed gas 28 to be injected into the water flowing above the plug assembly 10. Compressed gas 28 is delivered to the plug assembly by the upper gas line 27, which terminates at the bottom of the upper PVC flange in an airtight connection that allows the compressed gas to enter the space between the LDPE gasket 34 and the upper PVC flange 32. The compressed gas 28 then fills the entire space between the LDPE gasket 34 and the upper PVC flange 32 and then exits via the holes 33 in the upper flange and is injected into the water flowing above the plug assembly 10. While LDPE is shown as a preferred material for the gasket 34, other suitable materials may be used as well.

The PVC flanges are fastened together by two lifting eye bolts 30 and two support rods 31. The lifting eye bolts 30 are fitted with stainless steel cable of the proper size that runs up to the surface within the upper outer annular space to allow the safe lifting and lowering of the invention within the well using a portable winch located at the land surface 7. The two support rods 31 support the weight of the upper concentric pipe 4 and suspend the bottom of concentric pipe 4 a sufficient distance above the plug assembly 10 to allow room for the drain plug 9 and for water to flow unobstructed from the upper inner annular space into the upper outer annular space.

The drain plug 9 may be constructed in several different ways to serve the function intended, however the preferred construction as shown is comprised of a standard PVC pipe slip fix repair fitting mounted vertically in which holes are drilled into the body of the fitting between the limits of travel of the internal plunger, thus allowing water to pass from the outside of the fitting to within the center of the fitting if the plunger is raised, or to prevent such passage of water if the plunger is lowered.

The weight of the invention and the water contained therein during operation may be supported by the eductor tube resting upon the bottom of the well if the components are sized properly, or it may be supported by the cables fastened at the surface and to the lifting eye bolts 30 on the plug assembly 10, also if sized properly.

The system described herein provides for multiple locations of gas injection into water within a water well as it is pumped out of the well by air lift pumping or other means. The figures referenced herein and numbered parts described provide just one method of constructing the invention. The invention may be used as shown with both the upper and lower treatment sections simultaneously, or with just either one of the two treatment sections installed, depending on what is required for a particular application. Also, in both the upper and lower sections only two annular spaces formed by three concentric pipes for treatment are depicted for simplicity, however it is the embodiment of the invention that higher multiples of concentric pipes may be used to provide additional annular spaces for water travel and hence additional treatment passes to increase the effectiveness of the invention in treatment of water.

While the invention has been illustrated and described as an embodiment for treating groundwater via the multiple injections of gas within a water well it is not intended to be limited to the details shown as various modifications may be made from the details shown without differing from the nature of the invention.

What is claimed as new and desired to be protected by patent is set forth in the appended claims:

1. A system for treating groundwater including a means for directing water flow by gravity along multiple separate paths within a water well during the pumping process and a means for injecting compressed gas into the water at separate locations within each of the multiple separate paths and a means for transporting the injected gas to the top of the water well for collection or dispersion into the atmosphere after it has passed through the water, and a means for discharging the water at the top of the well after it has been treated, wherein said means for directing water flow by gravity along multiple separate paths within a water well during pumping, said well having a minimum water level and a maximum static water level, includes:

one or more pipes mounted concentrically within a lower section of a well casing below the minimum water level within the well during pumping and sealed at the bottom of the well but allowing alternating upward and downward flow of water by gravity from one annular space to another commencing with an upward flow within an outermost annular space and ending with a downward flow to a pumping inlet at the bottom of the well within an innermost annular space;

one or more pipes mounted concentrically within an upper section of the well casing above the maximum static water level within the well which allows alternating upward and downward flow of water by gravity from one annular space to another commencing with a downward flow within an innermost annular space and ending with an upward flow to a discharge outlet at the top of the well within an outermost annular space and a means for supporting the pipes at their bottom and separating them from the well below; and surge tanks mounted upon the tops of the concentric pipes mounted above the maximum static water level to prevent water flow during hydraulic surges.

2. The system of claim 1 wherein said means for injecting compressed gas into the water at separate locations within each of the multiple separate paths includes:

a compressed gas source comprising an air compressor or compressed gas tanks;

valves, pressure gauges, and gas flow meters for controlling the pressure and flow rate of the compressed gas;

one or more compressed gas admixture sources comprising compressed gas tanks;

valves, pressure gauges, and gas flow meters for controlling the pressure and flow rate of compressed gas admixtures into main compressed gas lines;

separate compressed gas lines for transporting compressed gas and compressed gas admixtures to separate injection points within each annular space in both the upper and lower well sections;

gas injection assemblies for injecting the gas into the water within each annular space in both the upper and lower well sections.

3. The system of claim 1 wherein said means for transporting the injected gas to the top of the water well for collection or dispersion into the atmosphere after it has passed through the water includes:

one or more vent tubes passing from the lower well section through a plug assembly and to the top of the well which may be vented to the atmosphere or fitted with collection devices to transport the gas to other equipment for treatment;

one or more surge tanks affixed to the top of the concentric pipes in the upper section of the well which may be fitted with caps to collect gas moving out of the water in the upper well section for transport to other equipment for treatment.

4. The system of claim 1 wherein said means for supporting the pipes mounted concentrically within the well casing above the maximum static water level within the well at their bottom and separating them from the well below includes:

a horizontal watertight plug placed above the maximum static water level within the well and supported either by cables attached to the plug and land surface or supported by a vertical pipe extending from the bottom of the plug to the bottom of the well;

a means for allowing vertical penetrations through the plug for the passage of compressed gas lines, vent tubes, and drain lines from above the plug to below the plug;

a means for draining water from the area above the plug to the area below the plug using a vent tube without obstructing the inside of the vent tube.

5. The system of claim 4 wherein said means for draining water from the area above the plug to the area below the plug using a vent tube without obstructing the inside of the vent tube includes:

a standard PVC pipe sliding slip style repair coupling mounted vertically in line with the vent tube and just above the upper surface of the plug in which holes are drilled into the body of the repair coupling between the limits of travel of the internal plunger, thus allowing water to pass from the outside of the fitting to within the center of the fitting if the plunger is raised, or to prevent such passage of water if the plunger is lowered.

* * * * *